United States Patent
Inoue et al.

(10) Patent No.: US 11,587,534 B2
(45) Date of Patent: Feb. 21, 2023

(54) PROJECTION CONTROL DEVICE, PROJECTION APPARATUS, PROJECTION CONTROL METHOD, AND PROJECTION CONTROL PROGRAM

(71) Applicant: FUJIFILM Corporation, Tokyo (JP)

(72) Inventors: Kazuki Inoue, Saitama (JP); Akihiro Ishizuka, Saitama (JP); Tomonori Masuda, Saitama (JP); Kazuki Ishida, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 12 days.

(21) Appl. No.: 17/484,607

(22) Filed: Sep. 24, 2021

(65) Prior Publication Data

US 2022/0013092 A1 Jan. 13, 2022

Related U.S. Application Data

(63) Continuation of application No. PCT/JP2020/004414, filed on Feb. 5, 2020.

(30) Foreign Application Priority Data

Mar. 25, 2019 (JP) .............................. JP2019-057126

(51) Int. Cl.
*G09G 5/38* (2006.01)
*G09G 3/00* (2006.01)

(52) U.S. Cl.
CPC ............... *G09G 5/38* (2013.01); *G09G 3/002* (2013.01); *G09G 2320/0666* (2013.01); *G09G 2340/0464* (2013.01); *G09G 2354/00* (2013.01)

(58) Field of Classification Search
CPC ....................................................... G09G 5/38
See application file for complete search history.

(56) References Cited

U.S. PATENT DOCUMENTS

2016/0291692 A1 10/2016 Yasuda et al.
2020/0082795 A1* 3/2020 Ano ..................... G09G 3/001

FOREIGN PATENT DOCUMENTS

JP 2002-244813 A 8/2002
JP 2006-277085 A 10/2006
(Continued)

OTHER PUBLICATIONS

International Preliminary Report on Patentability for International Application No. PCT/JP2020/004414, dated Jul. 16, 2020, with English translation.

(Continued)

*Primary Examiner* — Gustavo Polo
(74) *Attorney, Agent, or Firm* — Birch, Stewart, Kolasch & Birch, LLP

(57) ABSTRACT

A projection control device that controls a projection portion which projects an image to a projection surface includes a ray position detection portion that detects an irradiation position of a ray irradiated on the projection surface, and a specific image superimposition control portion that superimposes a predetermined specific image on a region corresponding to the irradiation position in the image. In a state where the specific image is superimposed on a first region corresponding to a first position detected by the ray position detection portion in the image, the specific image superimposition control portion, in a case where the irradiation position moves out of a predetermined range including the first position, moves the specific image to a region corresponding to the irradiation position that has moved, and in a case where the irradiation position moves within the range, continues superimposition of the specific image on the first region.

19 Claims, 12 Drawing Sheets

(56) References Cited

FOREIGN PATENT DOCUMENTS

| | | |
|---|---|---|
| JP | 2013-80296 A | 5/2013 |
| JP | 2017-220880 A | 12/2017 |
| WO | WO 2015/104884 A1 | 7/2015 |

OTHER PUBLICATIONS

International Search Report for International Application No. PCT/JP2020/004414, dated Apr. 14, 2020, with English translation.

* cited by examiner

ST1

ST2

ST1

ST2

ST3

ST4

ST5

ST6

ST7

ST8

ST9

ST10

PROJECTION CONTROL DEVICE, PROJECTION APPARATUS, PROJECTION CONTROL METHOD, AND PROJECTION CONTROL PROGRAM

CROSS REFERENCE TO RELATED APPLICATION

This is a continuation of International Application No. PCT/JP2020/004414 filed on Feb. 5, 2020, and claims priority from Japanese Patent Application No. 2019-057126 filed on Mar. 25, 2019, the entire disclosures of which are incorporated herein by reference.

BACKGROUND OF THE INVENTION

1. Field of the Invention

The present invention relates to a projection control device, a projection apparatus, a projection control method, and a projection control program.

2. Description of the Related Art

In a case of using a projector, for example, a laser pointer is used for pointing out any position on a displayed image. JP2017-220880A, JP2006-277085A, and JP2002-244813A disclose a projection apparatus that detects an irradiation position of laser light on a projection surface and superimposes an image such as an icon for making the position stand out on a projection image. In JP2002-244813A, it is disclosed that in a case where the irradiation position of the laser light transitions from a stationary state to movement, the icon displayed in accordance with the irradiation position is displayed at the same position for a certain time period.

SUMMARY OF THE INVENTION

Even in a case where it is desired to irradiate a specific position with the laser light using the laser pointer, the irradiation position of the laser light generally changes slightly due to vibrations of a hand of a person holding the laser pointer. In a case where the irradiation position of the laser light slightly changes, a position of the image such as the icon displayed in accordance with the irradiation position also moves slightly, and it is difficult to perceive which position is pointed out, or an observer of the projection image feels uncomfortable. Such a problem is not recognized in JP2017-220880A and JP2006-277085A.

In JP2002-244813A, a mode in which the position of the icon displayed in accordance with the irradiation position is fixed for a certain period is disclosed. However, the mode is intended to increase a degree of freedom of the user by continuing display of the icon even in a state where use of the laser pointer is stopped, and cannot resolve the problem caused by vibrations of the hand of the user.

The present invention is conceived in view of the above matter, and an object thereof is to provide a projection control device, a projection apparatus, a projection control method, and a projection control program capable of improving visibility of a projection image.

A projection control device of the present invention is a projection control device that controls a projection portion which projects an image to a projection surface, and comprises a ray position detection portion that detects an irradiation position of a ray irradiated on the projection surface, and a specific image superimposition control portion that superimposes a specific image on a region corresponding to the irradiation position in the image, in which in a state where the specific image is superimposed on a first region corresponding to a first position detected by the ray position detection portion in the image, the specific image superimposition control portion, in a case where the irradiation position detected by the ray position detection portion moves from a specific range including the first position to an outside of the specific range, moves the specific image to a region corresponding to the irradiation position that has moved to the outside of the specific range in the image, and in a case where the irradiation position detected by the ray position detection portion moves within the specific range, continues superimposition of the specific image on the first region.

A projection control device of the present invention is a projection control device that controls a projection portion which projects an image to a projection surface, and comprises a ray position detection portion that detects an irradiation position of a ray irradiated on the projection surface, and a specific image superimposition control portion that superimposes a specific image on a region corresponding to the irradiation position in the image, in which in a state where the specific image is superimposed on a first region corresponding to a first position detected by the ray position detection portion in the image, the specific image superimposition control portion, in a case where a movement state where the irradiation position detected by the ray position detection portion moves in one direction continues a number of times greater than or equal to a first threshold value, moves the specific image to a region corresponding to the last detected irradiation position in the image, and in a case other than the case where the movement state continues the number of times greater than or equal to the first threshold value, continues superimposition of the specific image on the first region.

A projection apparatus of the present invention comprises the projection control device of the present invention, and the projection portion.

A projection control method of the present invention is a projection control method of controlling a projection portion that projects an image to a projection surface, and comprises a ray position detection step of detecting an irradiation position of a ray irradiated on the projection surface, and a specific image superimposition control step of superimposing a specific image on a region corresponding to the irradiation position in the image, in which in the specific image superimposition control step, in a state where the specific image is superimposed on a first region corresponding to a first position detected in the ray position detection step in the image, in a case where the irradiation position detected in the ray position detection step moves from a specific range including the first position to an outside of the specific range, the specific image is moved to a region corresponding to the irradiation position that has moved to the outside of the specific range in the image, and in a case where the irradiation position detected in the ray position detection step moves within the specific range, superimposition of the specific image on the first region continues.

A projection control program of the present invention is a projection control program causing a computer to execute a projection control method of controlling a projection portion that projects an image to a projection surface, and comprising a ray position detection step of detecting an irradiation position of a ray irradiated on the projection surface, and a specific image superimposition control step of superimposing a specific image on a region corresponding to the irradiation position in the image, in which in the specific image superimposition control step, in a state where the specific image is superimposed on a first region corresponding to a first position detected in the ray position detection step in the image, in a case where the irradiation position detected in the ray position detection step moves from a specific range including the first position to an outside of the specific range, the specific image is moved to a region corresponding to the irradiation position that has moved to the outside of the specific range in the image, and in a case where the irradiation position detected in the ray position detection step moves within the specific range, superimposition of the specific image on the first region continues.

A projection control method of the present invention is a projection control method of controlling a projection portion that projects an image to a projection surface, and comprises a ray position detection step of detecting an irradiation position of a ray irradiated on the projection surface, and a specific image superimposition control step of superimposing a specific image on a region corresponding to the irradiation position in the image, in which in the specific image superimposition control step, in a state where the specific image is superimposed on a first region corresponding to a first position detected in the ray position detection step in the image, in a case where a movement state where the irradiation position detected in the ray position detection step moves in one direction continues a number of times greater than or equal to a first threshold value, the specific image is moved to a region corresponding to the last detected irradiation position in the image, and in a case other than the case where the movement state continues the number of times greater than or equal to the first threshold value, superimposition of the specific image on the first region continues.

A projection control program of the present invention is a projection control program causing a computer to execute a projection control method of controlling a projection portion that projects an image to a projection surface, and comprising a ray position detection step of detecting an irradiation position of a ray irradiated on the projection surface, and a specific image superimposition control step of superimposing a specific image on a region corresponding to the irradiation position in the image, in which in the specific image superimposition control step, in a state where the specific image is superimposed on a first region corresponding to a first position detected in the ray position detection step in the image, in a case where a movement state where the irradiation position detected in the ray position detection step moves in one direction greater than or equal to a first threshold value continues a number of times greater than or equal to a second threshold value, the specific image is moved to a region corresponding to the last detected irradiation position in the image, and in a case other than the case where the movement state continues a number of times greater than or equal to the second threshold value, superimposition of the specific image on the first region continues.

According to the present invention, a projection control device, a projection apparatus, a projection control method, and a projection control program capable of improving visibility of a projection image can be provided.

DESCRIPTION OF THE PREFERRED EMBODIMENTS

Hereinafter, an embodiment of the present invention will be described with reference to the drawings.

Figure 1:
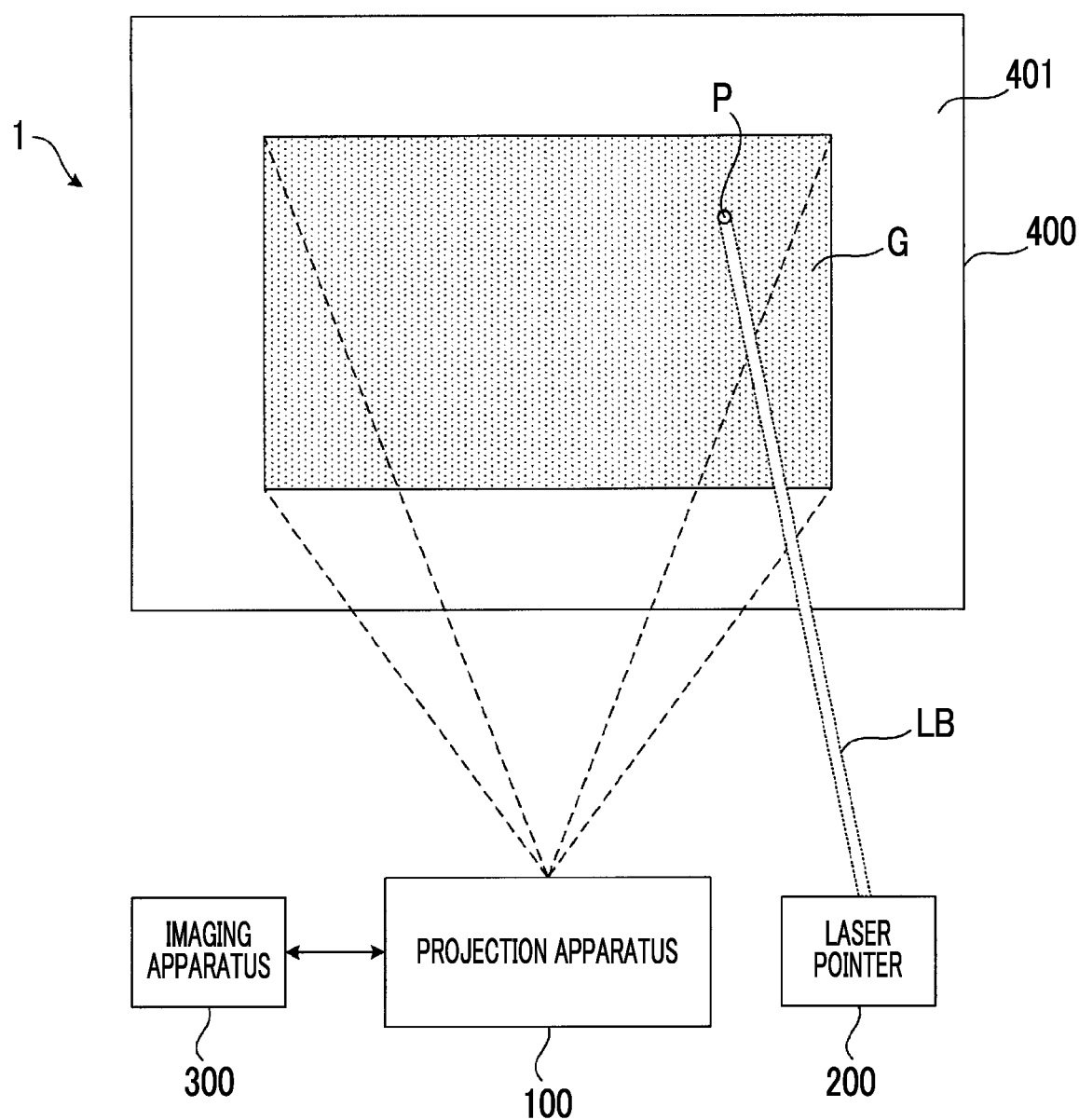
FIG. 1 is a configuration diagram of an image projection system including a projection apparatus of an embodiment of the present invention.

FIG. 1 is a configuration diagram of an image projection system including a projection apparatus of an embodiment of the present invention. An image projection system 1 comprises a projection apparatus 100, a laser pointer 200, an imaging apparatus 300, and a screen 400.

The projection apparatus 100 projects an image G to a projection surface 401 of the screen 400 based on input information from an external apparatus such as a personal computer.

The laser pointer 200 irradiates the projection surface 401 with a ray LB. Any location on the image G projected on the projection surface 401 can be pointed out by an irradiation position P of the ray LB on the projection surface 401. The laser pointer 200 of a handheld type is generally used.

The imaging apparatus 300 comprises an imaging element such as a charged coupled device (CCD) image sensor or a metal oxide semiconductor (MOS) image sensor that images a subject through an imaging optical system, and captures at least the image G projected on the projection surface 401. A captured image PG of the image G obtained by the imaging apparatus 300 is input into the projection apparatus 100.

Figure 2:
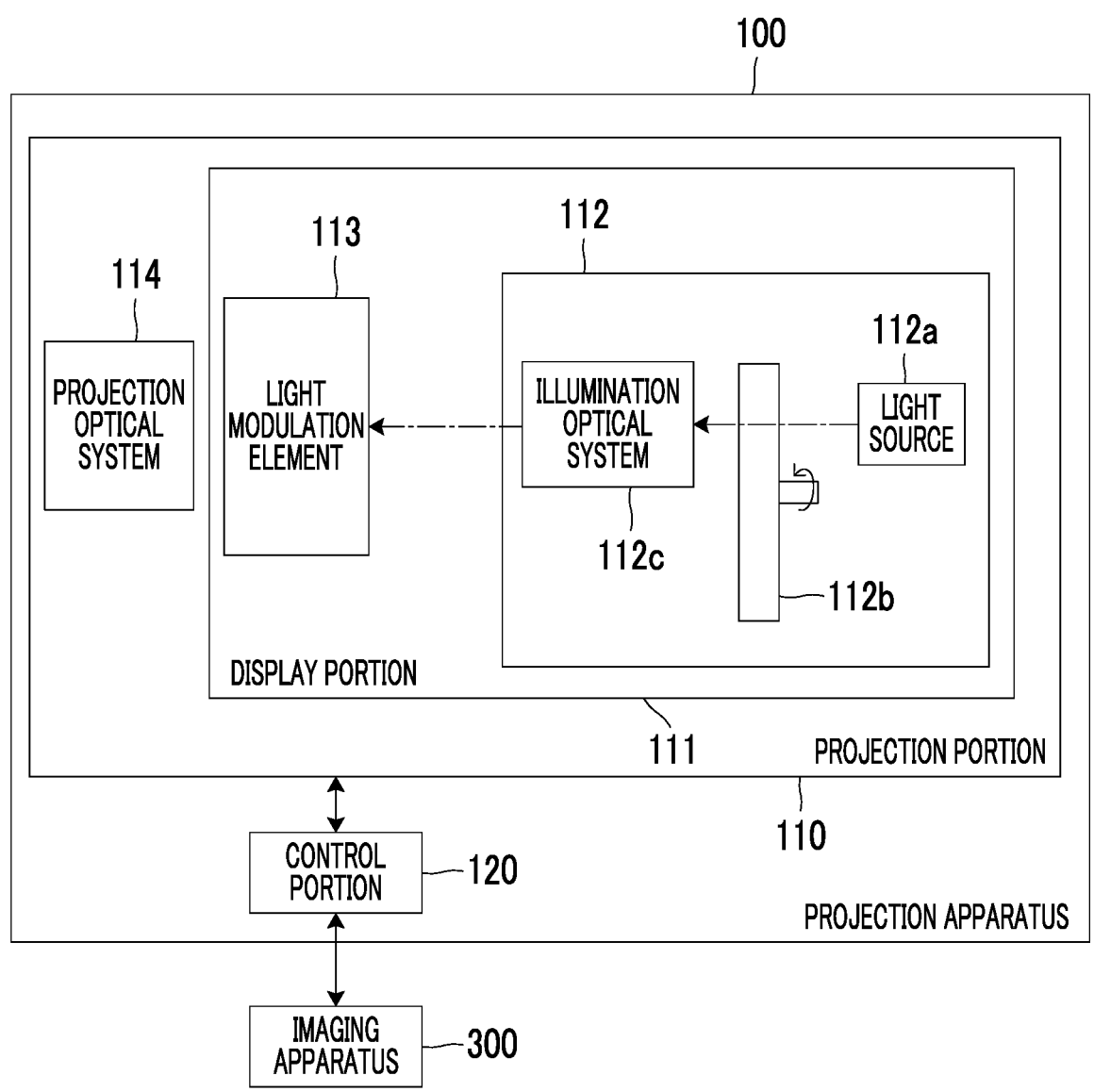
FIG. 2 is a configuration diagram of the projection apparatus illustrated in FIG. 1.

FIG. 2 is a configuration diagram of the projection apparatus 100 illustrated in FIG. 1. The projection apparatus 100 comprises a projection portion 110 and a control portion 120.

The projection portion 110 includes a display portion 111 and a projection optical system 114.

The display portion 111 displays an image for projection based on input image data. The display portion 111 comprises a light source unit 112 and a light modulation element 113.

The light source unit 112 comprises a light source 112a that emits white light, a color wheel 112b, and an illumination optical system 112c. The light source 112a is configured to include a light emitting element such as a laser or a light emitting diode (LED). The color wheel 112b is arranged between the light source 112a and the illumination optical system 112c. The color wheel 112b is a member having a circular plate shape. A filter that allows transmission of red light, a filter that allows transmission of green light, and a filter that allows transmission of blue light are disposed in a circumferential direction of the color wheel 112b. The color wheel 112b is rotated about a shaft and guides the white light emitted from the light source 112a to the illumination optical system 112c by separating the white light into red light, green light, and blue light in a time-division manner. Light emitted from the illumination optical system 112c is incident on the light modulation element 113.

The light modulation element 113 spatially modulates the light emitted from the illumination optical system 112c based on the image data and emits the spatially modulated light to the projection optical system 114. In the example in FIG. 2, a digital micromirror device (DMD) is used as the light modulation element 113. In the display portion 111, a liquid crystal on silicon (LCOS), a micro electro mechanical systems (MEMS) element, a liquid crystal display element, or the like may be used as the light modulation element.

In addition, the display portion 111 may display the image using a self-emitting organic electro-luminescence (EL) display element and cause the displayed image to be incident on the projection optical system 114. In addition, a display element that displays the image by scanning laser light may be used.

Light from the display portion 111 is incident on the projection optical system 114. The projection optical system 114 is configured with, for example, a relay optical system that includes at least one lens. Light that passes through the projection optical system 114 is projected to the projection surface 401.

The control portion 120 projects the image G to the projection surface 401 by controlling the projection portion 110 based on the input information from the external apparatus. In addition, the control portion 120 controls display of a point-out icon image TG displayed on the projection surface 401 based on the captured image PG obtained by the imaging apparatus 300.

The control portion 120 controls the entire projection apparatus 100 and has a hardware structure of various processors that perform processing by executing a program. The various processors include a central processing unit (CPU) that is a general-purpose processor performing various types of processing by executing a program, a programmable logic device (PLD) such as a field programmable gate array (FPGA) that is a processor having a circuit configuration changeable after manufacturing, a dedicated electric circuit such as an application specific integrated circuit (ASIC) that is a processor having a circuit configuration dedicatedly designed to execute a specific type of processing, or the like. The structure of these various processors is more specifically an electric circuit in which circuit elements such as semiconductor elements are combined. The control portion 120 may be configured with one of the various processors or may be configured with a combination of two or more processors of the same type or different types (for example, a combination of a plurality of FPGAs or a combination of a CPU and an FPGA).

Figure 3:
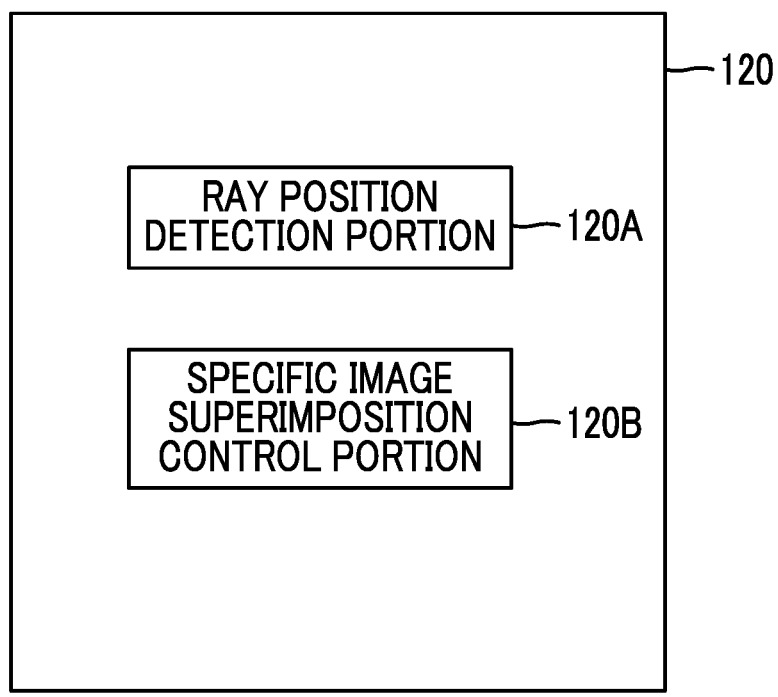
FIG. 3 is a function block diagram of a control portion of the projection apparatus illustrated in FIG. 2.

FIG. 3 is a function block diagram of the control portion 120 of the projection apparatus 100 illustrated in FIG. 2. The control portion 120 functions as a ray position detection portion 120A and a specific image superimposition control portion 120B by executing a projection control program.

The ray position detection portion 120A is a function block that detects the irradiation position P of the ray LB with which the image G of the projection surface 401 is irradiated, based on the captured image PG input from the imaging apparatus 300. Specifically, the ray position detection portion 120A detects, from the captured image PG, a region having a specific shape (for example, a circular shape) and the same color as the ray LB of irradiation from the laser pointer 200 as a pattern corresponding to the ray LB and detects a coordinate position of the detected pattern on the captured image PG as the irradiation position P of the ray LB in the image G Coordinates of each pixel of the image G and coordinates of each pixel of the captured image PG will be described as having a one-to-one correspondence therebetween.

The specific image superimposition control portion 120B is a function block that superimposes the point-out icon image TG having an arrow shape as a specific image on a region (region R described later) corresponding to the irradiation position P detected by the ray position detection portion 120A in the image G projected on the projection surface 401.

Figure 4:
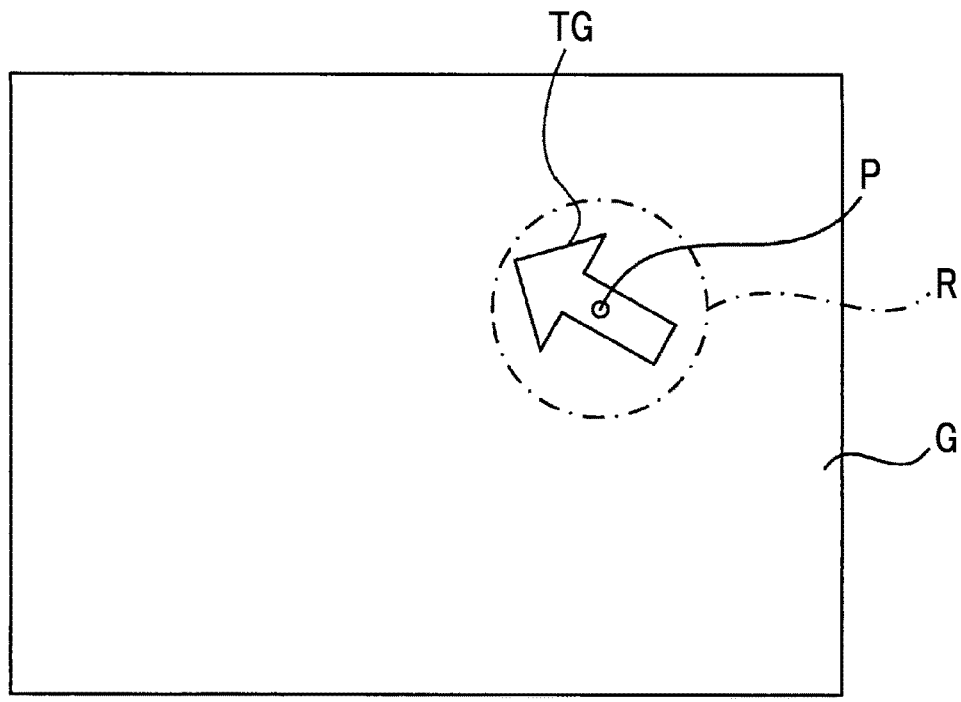
FIG. 4 is a schematic diagram for describing a relationship between an irradiation position and a point-out icon image.
Figure 4:
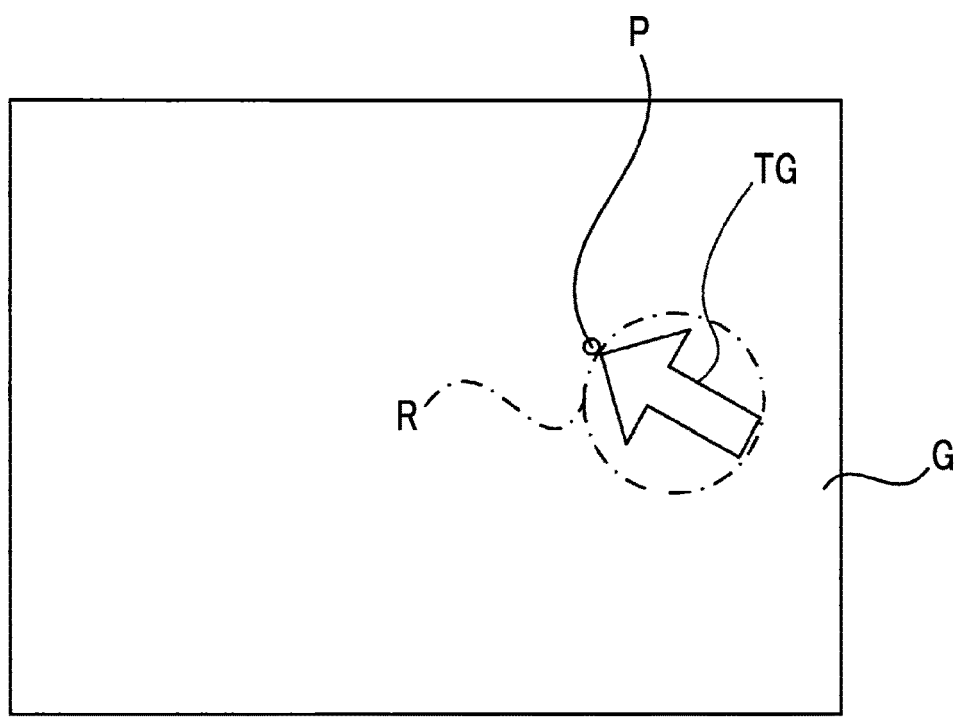

FIG. 4 is a schematic diagram for describing a relationship between the irradiation position P and the point-out icon image TG A state ST1 illustrated in FIG. 4 illustrates a first example of a display state of the point-out icon image TG A state ST2 illustrated in FIG. 4 illustrates a second example of the display state of the point-out icon image TG.

In a case where the irradiation position P is detected by the ray position detection portion 120A for the first time after projection of the image G is started, the specific image superimposition control portion 120B superimposes the point-out icon image TG on the region R in the image G with respect to the irradiation position P. In the state ST1 in FIG. 4, the region R is a region surrounded by a circle centered at the irradiation position P. In addition, in the state ST2 in FIG. 4, the region R is a region surrounded by a circle adjacent to the irradiation position P.

The specific image superimposition control portion 120B superimposes the point-out icon image TG at a predetermined position in the region R. In the state ST1 in FIG. 4, the point-out icon image TG of which an outer edge shape is an arrow shape is superimposed in the region R that is compartmented as a circle centered at the irradiation position P. In addition, in the state ST1, the point-out icon image TG is superimposed in the region R in a state where a middle position in each of a direction pointed out by the arrow and a direction orthogonal thereto matches the irradiation position P in the point-out icon image TG (in other words, a state where the point-out icon image TG covers the irradiation position P). In addition, in the state ST2 in FIG. 4, the point-out icon image TG is superimposed at the predetermined position in the region R compartmented as a circle adjacent to the irradiation position P.

While the outer edge shape of the point-out icon image TG is the arrow shape, this shape is not limited, and the point-out icon image TG may be an image having any outer edge shape. For example, the point-out icon image TG may be an image having a triangular outer edge shape, an image having a circular outer edge shape, or the like.

In a state where the point-out icon image TG is superimposed on the image the specific image superimposition control portion 120B sets a specific range including the irradiation position P in the image G as the camera shake allowance range.

Figure 5:
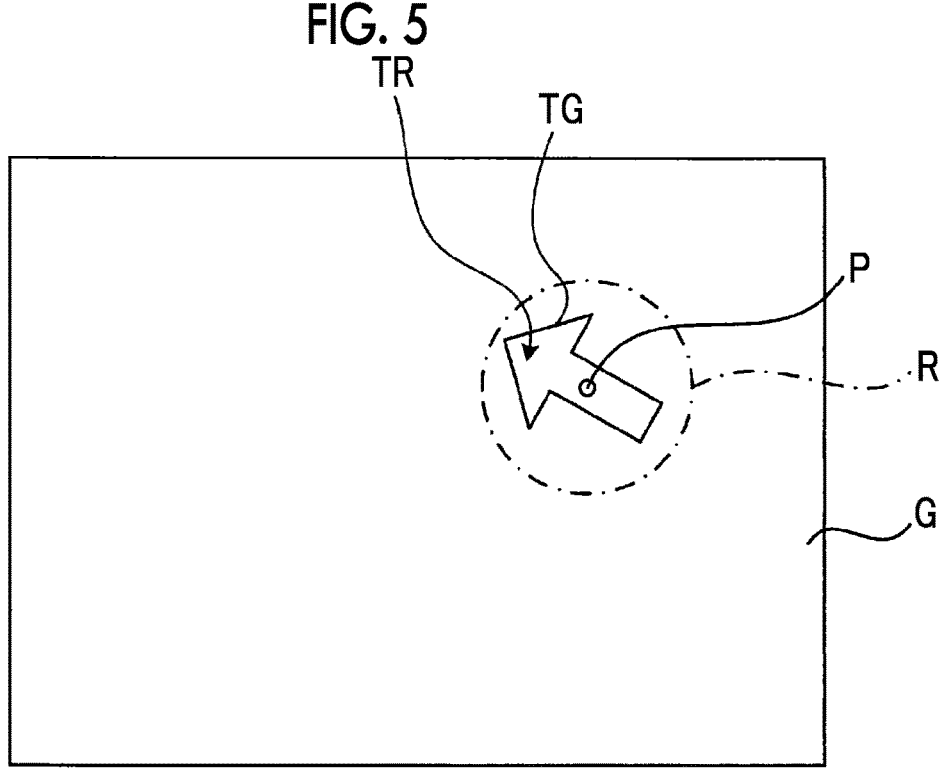
FIG. 5 is a schematic diagram illustrating an example of a camera shake allowance range set in a state ST1 and a state ST2 illustrated in FIG. 4.
Figure 5:
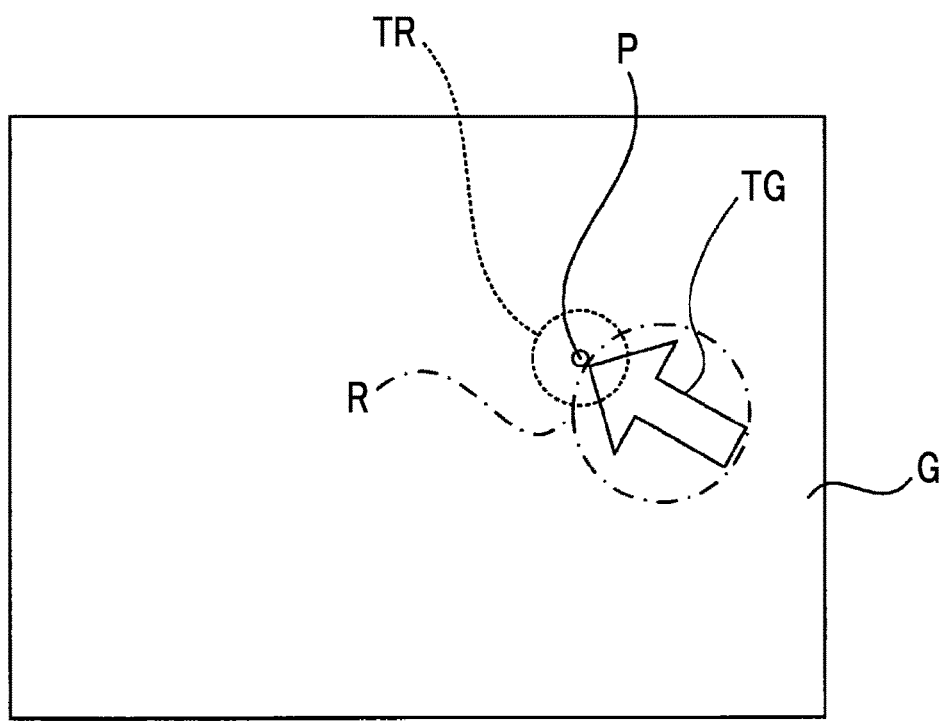

FIG. 5 illustrates an example of a camera shake allowance range TR set in the state ST1 and the state ST2 illustrated in FIG. 4. In the state ST1, as illustrated in FIG. 5, the specific image superimposition control portion 120B sets a range overlapping with the point-out icon image TG in the image G as the camera shake allowance range TR. In addition, in the state ST2, as illustrated in FIG. 5, the specific image superimposition control portion 120B sets a range surrounded by a circle centered at the irradiation position P in the image G as the camera shake allowance range TR.

In a case where the camera shake allowance range TR illustrated in FIG. 5 is set, the specific image superimposition control portion 120B controls a superimposition position of the point-out icon image TG on the image G based on the irradiation position P detected by the ray position detection portion 120A in a state where the camera shake allowance range TR is set, and the set camera shake allowance range TR.

Specifically, in a case where the irradiation position P detected by the ray position detection portion 120A is within the set camera shake allowance range TR, the specific image superimposition control portion 120B does not update setting of the region R associated with the most recent detected irradiation position P and maintains setting of the region R. Accordingly, since the point-out icon image TG continues to be superimposed at the predetermined position in the set region R, the point-out icon image TG is not moved.

Figure 6:
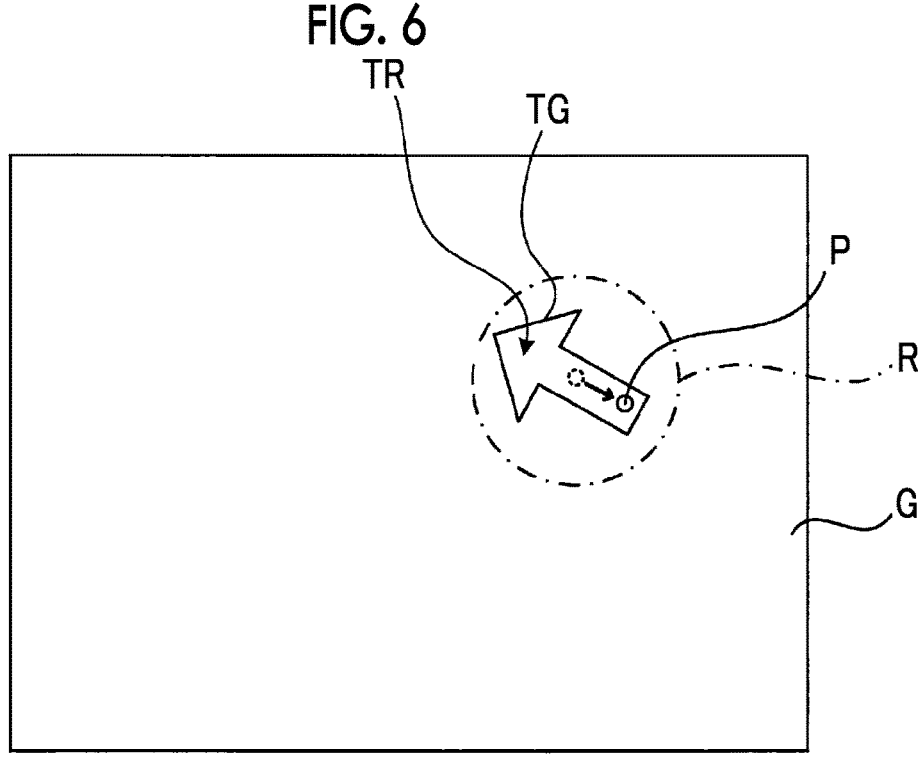
FIG. 6 is a schematic diagram illustrating a display example of an image in a case where the irradiation position moves within the camera shake allowance range in a state where the camera shake allowance range is set as illustrated in the state ST1 in FIG. 5.
Figure 6:
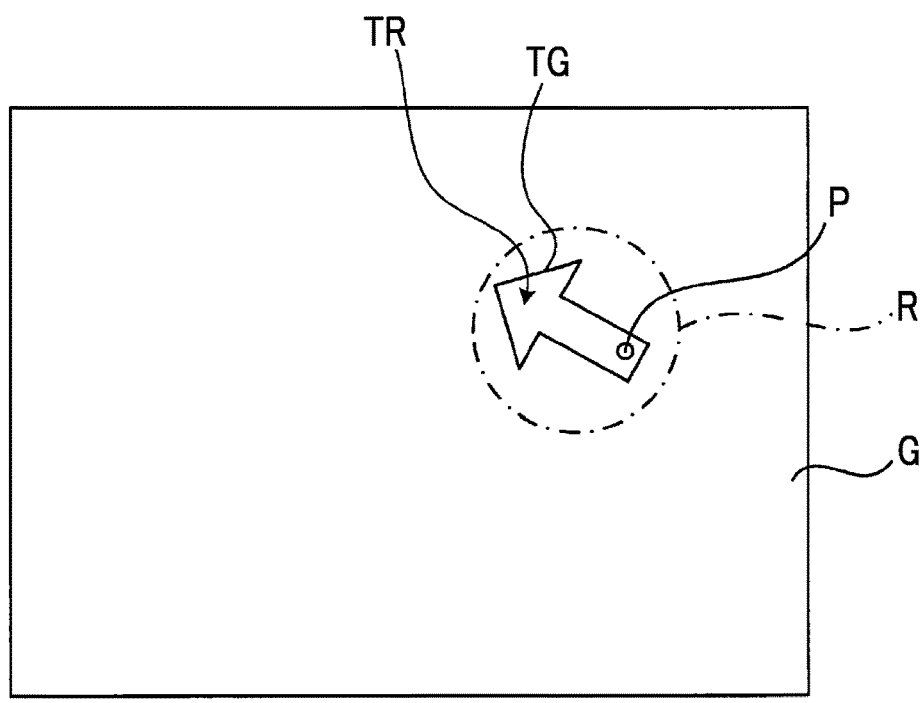

FIG. 6 illustrates a display example of the image G in a case where the irradiation position P moves within the camera shake allowance range TR in a state where the camera shake allowance range TR is set as illustrated in the state ST1 in FIG. 5. A state ST3 illustrated in FIG. 6 illustrates a state where the irradiation position P moves within the camera shake allowance range TR in a lower-right oblique direction from the state ST1 in FIG. 5. In the state ST3, the specific image superimposition control portion 120B maintains setting of the region R and maintains the superimposition position of the point-out icon image TG in the state ST3 regardless of the most recent irradiation position P as illustrated in a state ST4 in FIG. 6. Accordingly, the specific image superimposition control portion 120B does not change the superimposition position of the point-out icon image TG in a state where the irradiation position P moves within the camera shake allowance range TR.

Meanwhile, in a case where the irradiation position P detected by the ray position detection portion 120A moves out of the set camera shake allowance range TR, the specific image superimposition control portion 120B sets the region R again in association with the most recent detected irradiation position P and changes the superimposition position of the point-out icon image TG in accordance with the region R set again.

Figure 7:
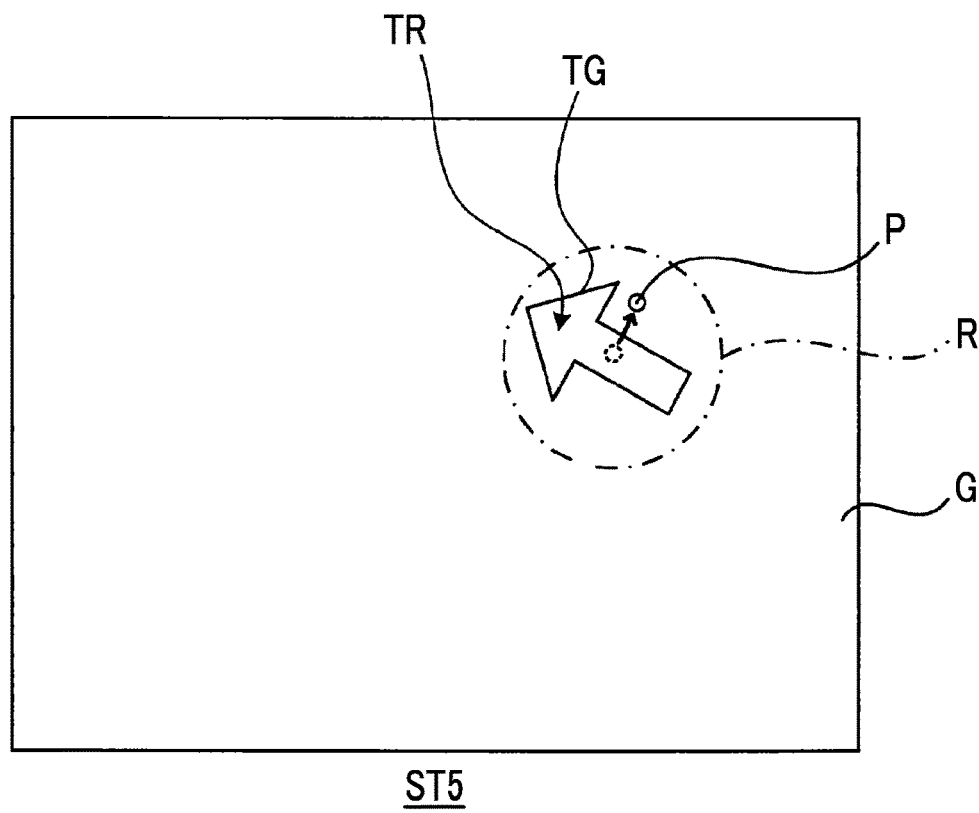
FIG. 7 is a schematic diagram illustrating a display example of an image in a case where the irradiation position moves out of the camera shake allowance range in a state where the camera shake allowance range is set as illustrated in the state ST1 in FIG. 5.
Figure 7:
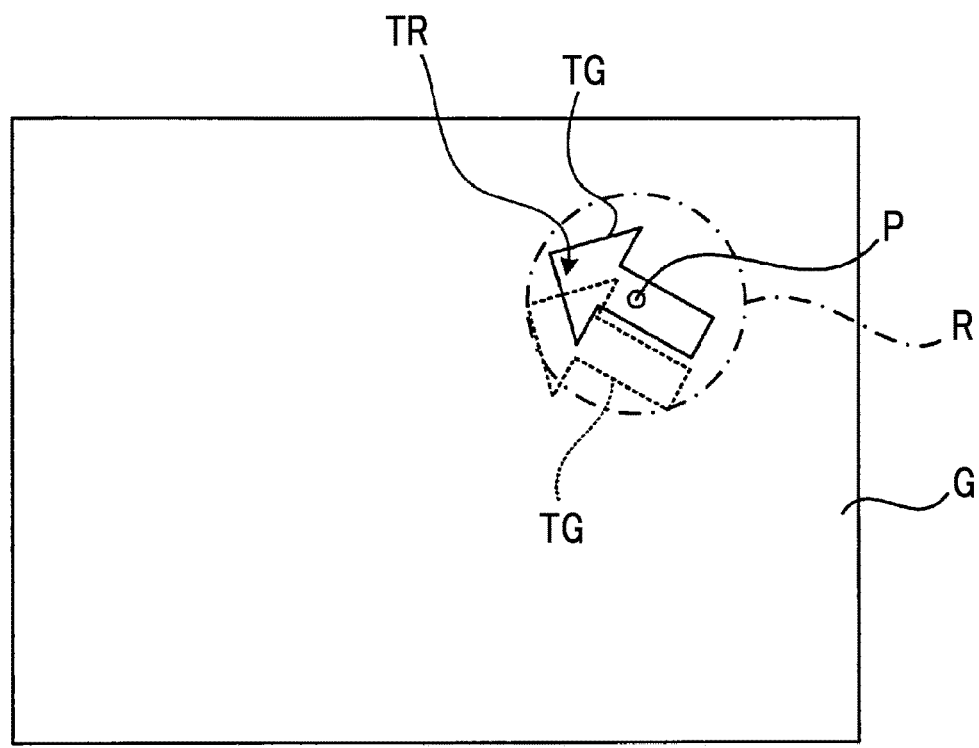

FIG. 7 illustrates a display example of the image G in a case where the irradiation position P moves out of the camera shake allowance range TR in a state where the camera shake allowance range TR is set as illustrated in the state ST1 in FIG. 5. A state ST5 illustrated in FIG. 7 illustrates a state where the irradiation position P moves out of the camera shake allowance range TR from the state ST1 in FIG. 5. In the state ST5, the specific image superimposition control portion 120B sets the region R again in association with the most recent irradiation position P and moves the superimposition position of the point-out icon image TG in an upper-right oblique direction from the state ST5 in accordance with updated setting of the region R as illustrated in a state ST6 in FIG. 7. Accordingly, the specific image superimposition control portion 120B changes the superimposition position of the point-out icon image TG in accordance with the irradiation position P in a state where the irradiation position P moves out of the camera shake allowance range TR.

As described above, by moving the point-out icon image TG to the region R corresponding to the irradiation position P after movement only in a case where the irradiation position P moves out of the camera shake allowance range TR, movement of the point-out icon image TG caused by slight vibrations of a hand of the user operating the laser pointer 200 can be suppressed. In other words, since the point-out icon image TG continues to be displayed in a stationary state as long as the irradiation position P does not move out of the camera shake allowance range TR, a target position intended by the user operating the laser pointer 200 is easily pointed out by the point-out icon image TG Thus, according to the embodiment, since the target position in the image G can be clearly pointed out by the point-out icon image TG, visibility of a projection image is improved.

In addition, as illustrated in the state ST1 in FIG. 5, by setting a range overlapping with the point-out icon image TG in the image G as the camera shake allowance range TR, the user can easily recognize the camera shake allowance range TR. According to this configuration, in a case where the user does not desire to move the point-out icon image TG, the user may operate the irradiation position of the ray LB to stay within the point-out icon image TG In a case where the user desires to move the point-out icon image TG, the user may operate the irradiation position of the ray LB to move out of the point-out icon image TG Accordingly, operability of the point-out icon image TG can be improved.

First Modification Example

Figure 8:
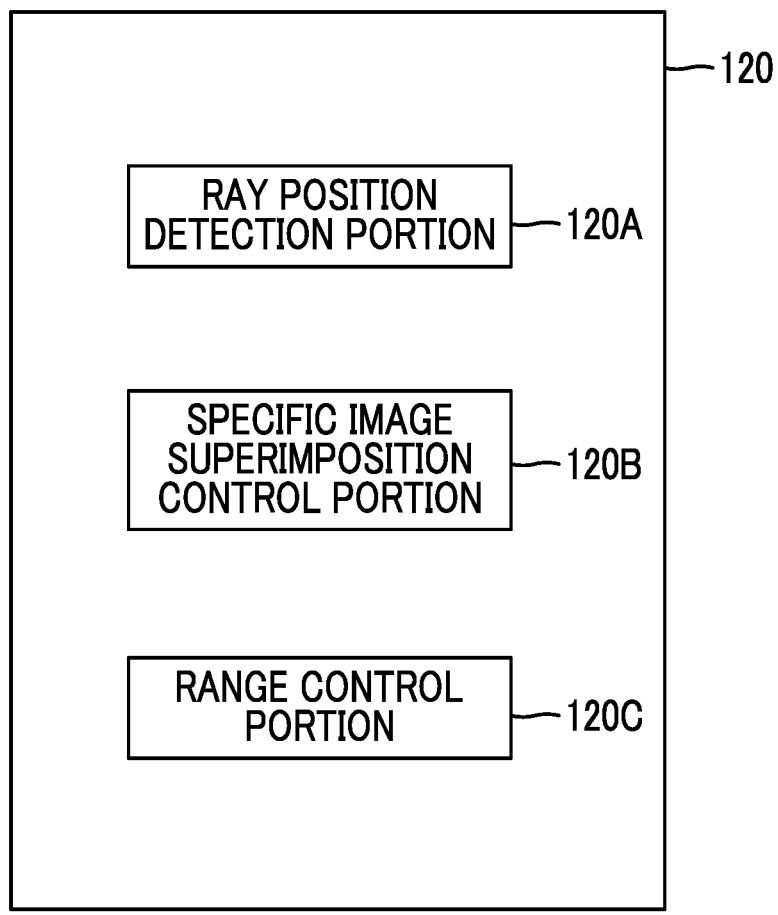
FIG. 8 is a function block diagram of a modification example of the control portion of the projection apparatus illustrated in FIG. 2.

FIG. 8 is a function block diagram of a modification example of the control portion 120 of the projection apparatus 100 illustrated in FIG. 2. In the following description, the same constituents as described above will be designated by common reference numerals, and descriptions thereof may be appropriately omitted.

The control portion 120 illustrated in FIG. 8 functions as the ray position detection portion 120A, the specific image superimposition control portion 120B, and a range control portion 120C by executing the projection control program.

The range control portion 120C is a function block that controls the camera shake allowance range TR. The range control portion 120C changes a size of the camera shake allowance range TR automatically or based on an input operation performed by the user. The specific image superimposition control portion 120B of this modification example controls the superimposition position of the point-out icon image TG based on the camera shake allowance range TR changed by the range control portion 120C.

For example, as a distance between the user and the projection surface 401 is increased, the irradiation position P moves more significantly by a slight camera shake. Thus, it is difficult to maintain the irradiation position P within a narrow range. Thus, the range control portion 120C sets the camera shake allowance range TR in accordance with the distance input by the user. Specifically, in a case where the input distance is greater than or equal to a threshold value, the range control portion 120C increases the camera shake allowance range TR compared to a case where the distance is less than the threshold value. Accordingly, since slight movement of the point-out icon image TG can be suppressed, the visibility of the projection image can be improved.

In addition, it is considered that a camera shake amount changes for each user depending on factors such as an age of the user, muscular strength of the user, strengths and weaknesses of the user, and the like. Thus, the range control portion 120C sets the camera shake allowance range TR in accordance with setting information input by the user. Specifically, the range control portion 120C prepares a plurality of sizes as the camera shake allowance range TR and sets the camera shake allowance range TR having a size designated from the user. Accordingly, the user can easily fix a position of the point-out icon image TG at a desired position.

Second Modification Example

Figure 9:
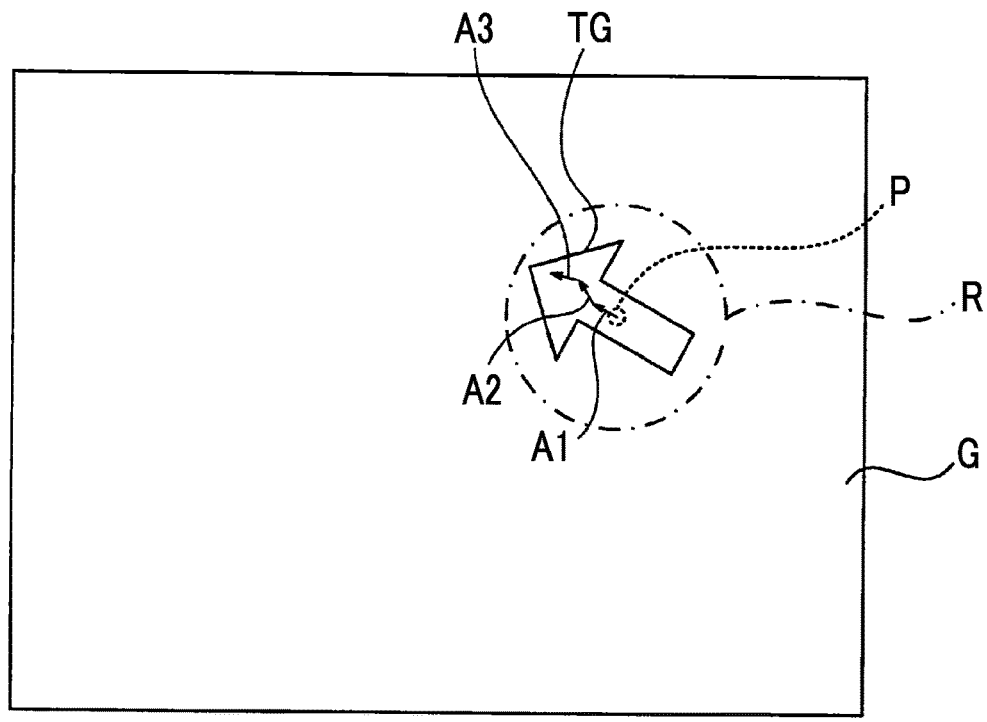
FIG. 9 is a descriptive diagram for a modification example of a display control operation of the point-out icon image performed by the control portion illustrated in FIG. 3.
Figure 9:
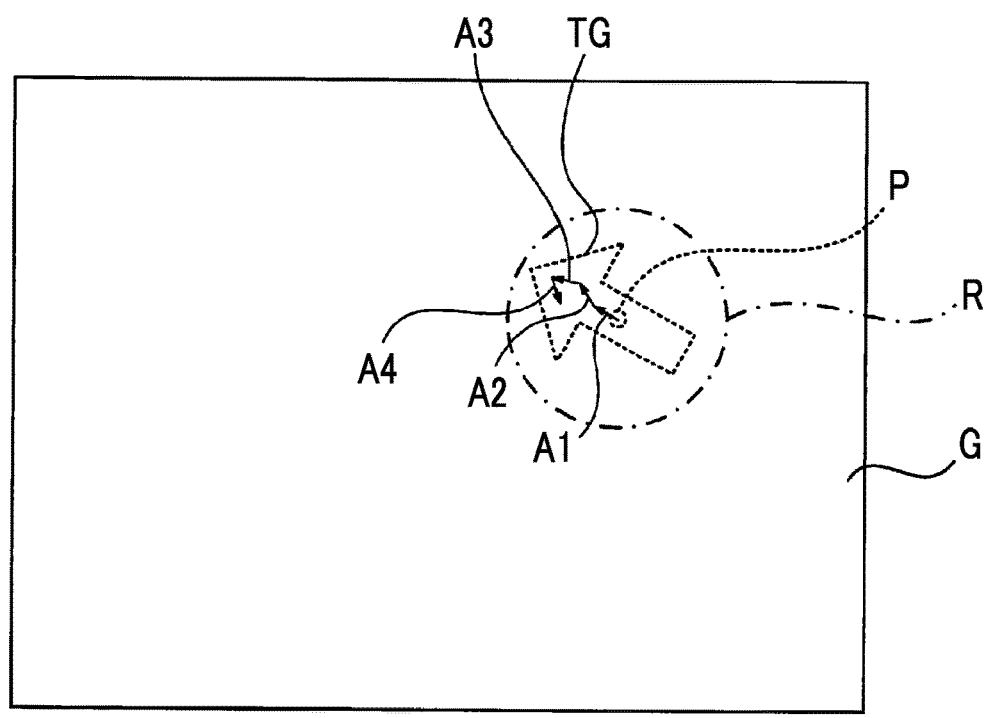
Figure 10:
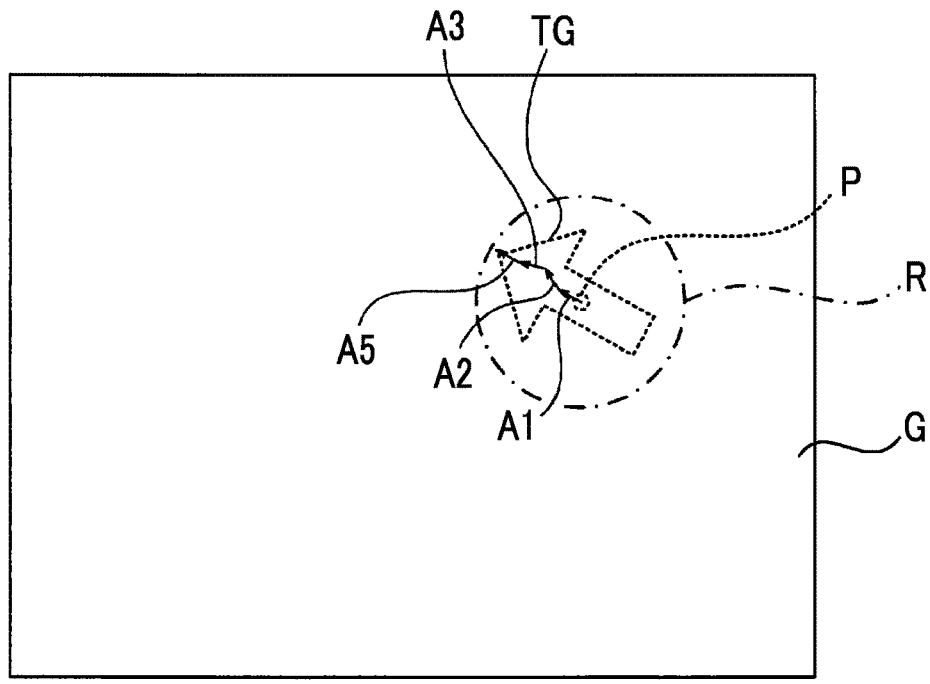
FIG. 10 is a descriptive diagram for a modification example of the display control operation of the point-out icon image performed by the control portion illustrated in FIG. 3.
Figure 10:
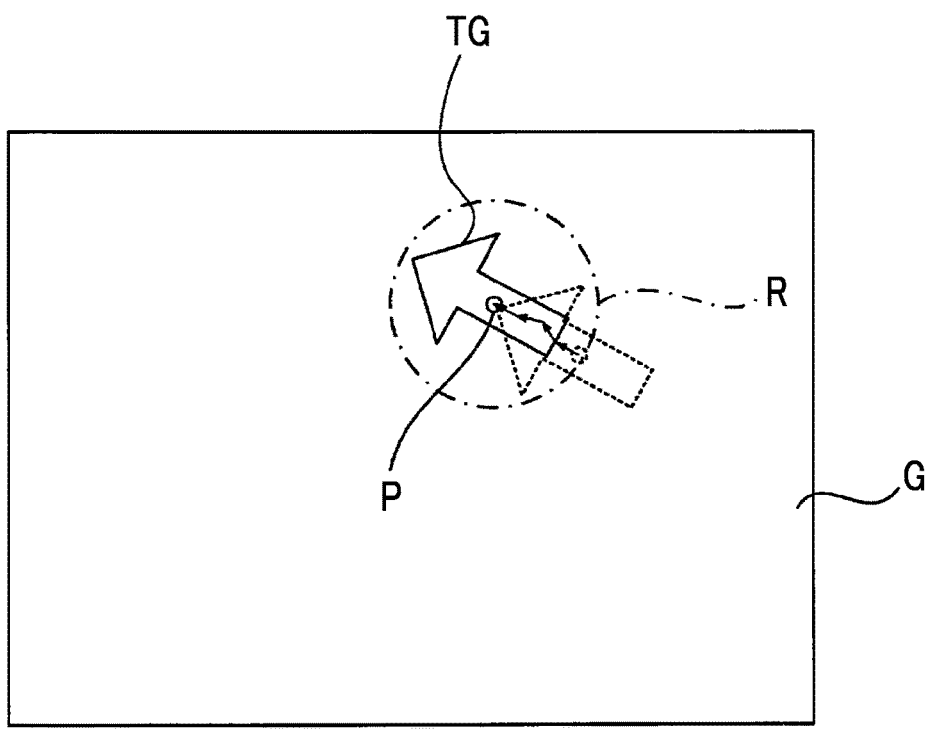

FIG. 9 and FIG. 10 are descriptive diagrams for a modification example of a display control operation of the point-out icon image TG performed by the control portion 120 illustrated in FIG. 3. In this modification example, the specific image superimposition control portion 120B controls the superimposition position of the point-out icon image TG based on whether or not a movement state where the irradiation position P moves in one direction occurs a number of times greater than or equal to a first threshold value.

Specifically, each time the irradiation position P is detected by the ray position detection portion 120A after the region R is set, the specific image superimposition control portion 120B obtains a direction of a vector that has the irradiation position P as a terminal point and has the irradiation position P detected at an immediately previous detection timing of the irradiation position P as an initial point. In a case where a state where the direction of the obtained vector is the same continues a number of times equal to the first threshold value, the specific image superimposition control portion 120B determines that the movement state where the irradiation position P moves in one direction occurs a number of times greater than or equal to the first threshold value.

A state where directions of two vectors are the same refers to a state where, in a case where two orthogonal coordinate axes (axes extending in each of a vertical direction and a horizontal direction of the image G) having origins at respective initial points of the vectors are set, a terminal point of each vector is present in the same quadrant among four quadrants compartmented by the two coordinate axes.

The number of times equal to the first threshold value may be a plural number of times and, in the following description, will be described as three times. In FIG. 9 and FIG. 10, vectors A1, A2, A3, A4, and A5 that are obtained each time the irradiation position P is detected after setting of the region R are illustrated.

In a state ST7 in FIG. 9, a direction of the vector A1 and a direction of the vector A2 are the same, and a direction of the vector A2 and a direction of the vector A3 are the same. The movement state where the irradiation position P moves in one direction continues twice. In a case where directions of two consecutive vectors obtained in time series are the same, the specific image superimposition control portion 120B counts up a count value of the number of times the movement state continues. In the state ST7 in FIG. 9, the count value is "1" immediately before a timing of determining that the directions of the consecutive vectors A1 and A2 are the same. The count value is "2" immediately before a timing of determining that the directions of the consecutive vectors A2 and A3 are the same.

In a case where the irradiation position P moves in, for example, a lower-right oblique direction from the state ST7, the vector A4 is obtained as illustrated in a state ST8. A direction of the vector A4 is different from the direction of the vector A3. In a case where directions of two consecutive vectors obtained in time series are different, the specific image superimposition control portion 120B resets the count value of the number of times the movement state continues, to an initial value of "0". In the state ST8 in FIG. 9, the count value is "0" immediately before a timing of determining that the directions of the consecutive vectors A3 and A4 are different.

In a case where the irradiation position P moves in, for example, an upper-left oblique direction from the state ST7 in FIG. 9, the vector A5 is obtained as illustrated in a state ST9 in FIG. 10. A direction of the vector A5 is the same as the direction of the vector A3. Accordingly, the specific image superimposition control portion 120B changes the count value to "3" in the state ST9 in FIG. 10. In a case where the count value is "3", the specific image superimposition control portion 120B determines that the movement state where the irradiation position P moves in one direction continues a number of times greater than or equal to the first threshold value, and sets the region R centered at the most recent irradiation position P (terminal point of the vector A5) as illustrated in a state ST10 in FIG. 10. The point-out icon image TG is superimposed at the predetermined position in the region R. Accordingly, as perceived by comparing the state ST9 with the state ST10, the point-out icon image TG moves in correspondence with the last detected irradiation position P.

In a case where the count value is less than "3", the specific image superimposition control portion 120B maintains setting of the already set region R and does not move the point-out icon image TG as illustrated in FIG. 9. Thus, even in a state where the irradiation position P is under slight movement caused by vibrations of the hand of the user operating the laser pointer 200, the point-out icon image TG can be displayed in a stationary manner without causing the point-out icon image TG to follow the motion.

Accordingly, by moving the point-out icon image TG only in a case where the movement state where the irradiation position P moves in one direction continues a number of times greater than or equal to the first threshold value, slight movement of the point-out icon image TG caused by vibrations of the hand of the user operating the laser pointer 200 can be suppressed. Thus, the visibility of the projection image can be improved.

Third Modification Example

Figure 11:
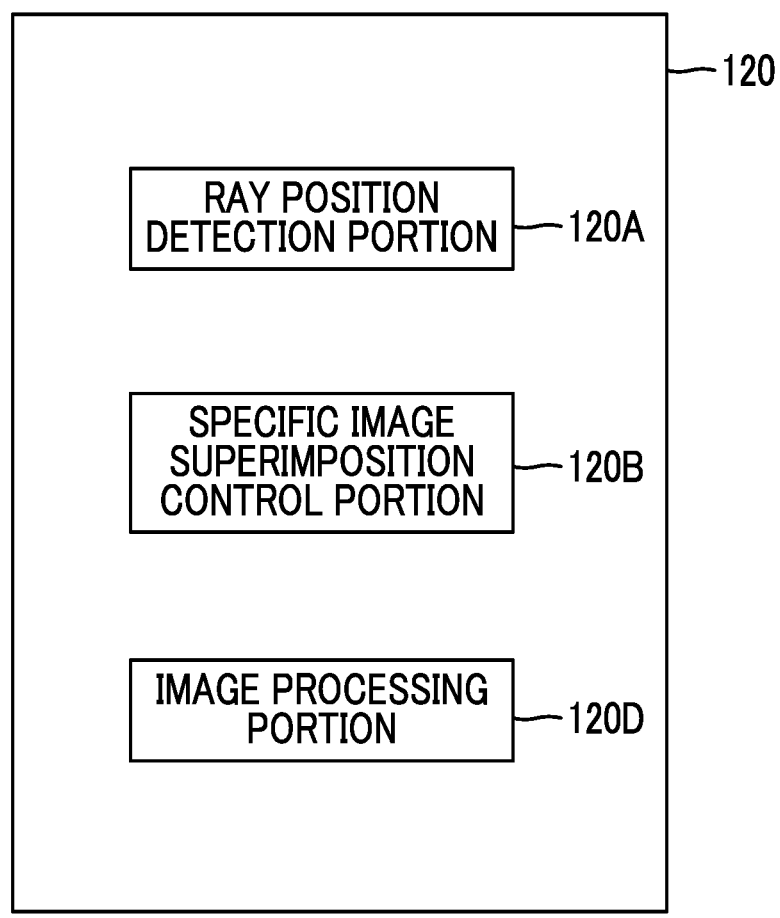
FIG. 11 is a function block diagram of another modification example of the control portion of the projection apparatus illustrated in FIG. 2.

FIG. 11 is a function block diagram of another modification example of the control portion 120 of the projection apparatus 100 illustrated in FIG. 2. In the following description, the same constituents as described above will be designated by common reference numerals, and descriptions thereof may be appropriately omitted.

The control portion 120 illustrated in FIG. 11 functions as the ray position detection portion 120A, the specific image superimposition control portion 120B, and an image processing portion 120D by executing the projection control program.

In a case where a state where a change amount of the irradiation position P detected by the ray position detection portion 120A is less than or equal to a second threshold value continues, the image processing portion 120D performs correction processing for making a part corresponding to the irradiation position P in the image G not stand out on the image G The part corresponding to the irradiation position P in the image G is a region that covers at least the pattern corresponding to the ray LB detected from the captured image PG.

As described above, the ray position detection portion 120A detects, from the captured image PQ a region having a specific shape (for example, a circular shape) and the same color as the ray LB of irradiation from the laser pointer 200 as the pattern corresponding to the ray LB. For example, in a case where a marking (an attachment, a stain, or a scratch) or the like that has the same color as the ray LB and is similar to an irradiation shape of light formed at projection of the ray LB on the projection surface 401 is present in a region in which the image G is projected in the projection surface 401, this marking is detected as the pattern corresponding to the ray LB.

This marking may slightly move due to swinging or the like of the screen 400 but does not significantly move as time passes. Thus, the image processing portion 120D determines whether or not a state where the change amount of the irradiation position P detected by the ray position detection portion 120A is less than or equal to the second threshold value (preferably, "0 pixels" or a value close thereto) continues for a predetermined time period, and in a case where this state continues for the predetermined time period, determines that the irradiation position P detected by the ray position detection portion 120A is a position of the marking. The image processing portion 120D generates correction data for making the marking less visible in a case where the image is projected in a region overlapping with at least the marking in the image G By correcting the image G using the correction data, the image G in which the marking is removed can be displayed, and quality of the projection image can be increased.

In addition, according to the modification example in FIG. 11, erroneous display of the point-out icon image TG due to the marking on the projection surface 401 can be prevented, and display not intended by the user can be prevented.

Fourth Modification Example

A modification example of functions of the control portion 120 illustrated in FIG. 3 will be described in the present modification example. The specific image superimposition control portion 120B of the present modification example superimposes the point-out icon image TG at a position covering the irradiation position P as illustrated in the state ST1 in FIG. 4 and, in a case where the point-out icon image TG is superimposed on the image switches between processing of controlling a color of the point-out icon image TG to a first color and processing of controlling the color of the point-out icon image TG to a second color different from the first color. Switching between the first color and the second color is performed at a speed such that a person cannot recognize the switching. The first color is the same color as a color of the ray LB of irradiation from the laser pointer 200. The second color is preferably a color complementary to the color of the ray LB.

In a state where the color of the point-out icon image TG is controlled to the second color, the ray position detection portion 120A of the present modification example detects the pattern corresponding to the ray LB from the captured image PG obtained by imaging the projection surface 401 by the imaging apparatus 300.

Accordingly, the color of the point-out icon image TG is switched at a high speed between the first color which is the original color and the second color different from the first color, and the pattern corresponding to the ray LB is detected from the captured image PG of the projection surface 401 in a case where the color of the point-out icon image TG is the second color. By doing so, the irradiation position P can be accurately detected even in a case where the color of the point-out icon image TG and the color of the ray LB are the same color. According to a configuration in which the color of the point-out icon image TG and the color of the ray LB are the same, it is possible to make the irradiation position of the ray LB not visible by an observer of the image and the quality of the projection image can be improved.

Fifth Modification Example

Figure 12:
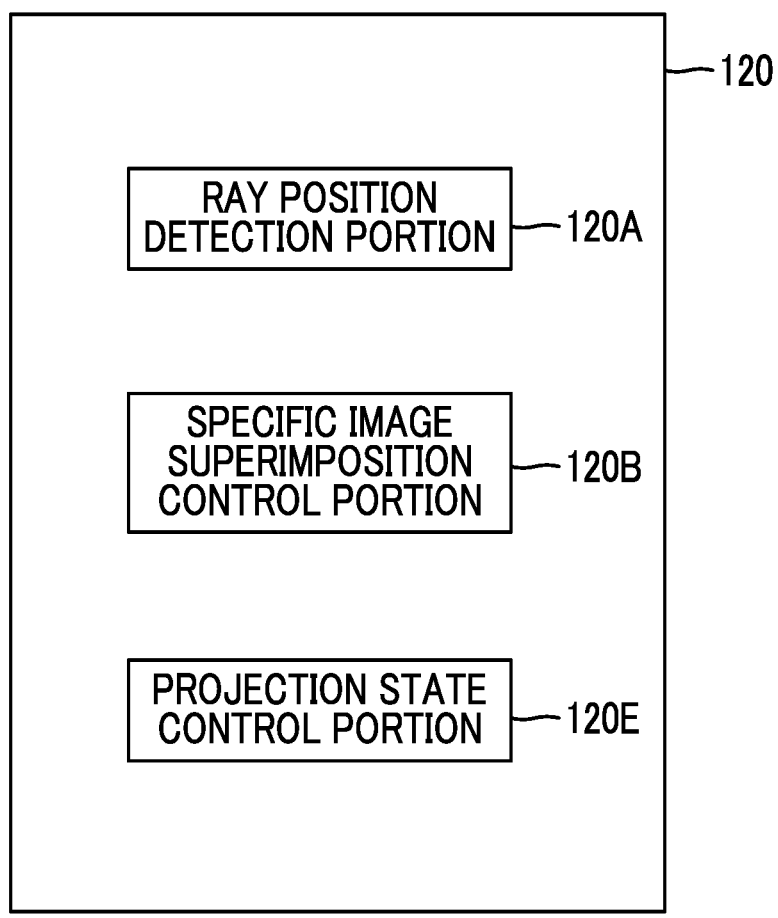
FIG. 12 is a function block diagram of still another modification example of the control portion of the projection apparatus illustrated in FIG. 2.

FIG. 12 is a function block diagram of still another modification example of the control portion 120 of the projection apparatus 100 illustrated in FIG. 2. In the following description, the same constituents as described above will be designated by common reference numerals, and descriptions thereof may be appropriately omitted.

The control portion 120 illustrated in FIG. 12 functions as the ray position detection portion 120A, the specific image superimposition control portion 120B, and a projection state control portion 120E by executing the projection control program.

The specific image superimposition control portion 120B of the present modification example superimposes the point-out icon image TG at a position covering the irradiation position P as illustrated in the state ST1 in FIG. 4 and controls the color of the point-out icon image TG superimposed on the image G to the same color as the color of the ray LB of irradiation from the laser pointer 200.

The projection state control portion 120E performs a control for switching between a projection state where the image G is projected from the projection portion 110, and a non-projection state where the image G is not projected from the projection portion 110. Switching between the projection state and the non-projection state is performed at a speed such that a person cannot recognize the switching.

In a state where the control is performed to the non-projection state, the ray position detection portion 120A of the present modification example detects the pattern corresponding to the ray LB from the captured image PG obtained by imaging the projection surface 401 by the imaging apparatus 300.

Accordingly, even in a case where the color of the point-out icon image TG superimposed on the image G is the same as the color of the ray LB, the irradiation position P can be accurately detected by switching between the projection state where the image G is projected, and the non-projection state where the image G is not projected, and detecting the pattern corresponding to the ray LB from the captured image PG of the projection surface 401 in the non-projection state.

At least the following matters are disclosed in the present specification. While corresponding constituents and the like in the embodiment are shown in parentheses, the present invention is not limited thereto.

(1) A projection control device (control portion 120) that controls a projection portion (projection portion 110) which projects an image (image G) to a projection surface (projection surface 401), the projection control device comprising a ray position detection portion (ray position detection portion 120A) that detects an irradiation position (irradiation position P) of a ray (ray LB) irradiated on the projection surface, and a specific image superimposition control portion (specific image superimposition control portion 120B) that superimposes a specific image (point-out icon image TG) on a region (region R) corresponding to the irradiation position in the image, in which in a state (state ST1) where the specific image is superimposed on a first region (region R in the state ST1) corresponding to a first position (irradiation position P in the state ST1) detected by the ray position detection portion in the image, the specific image superimposition control portion, in a case where the irradiation position detected by the ray position detection portion moves from a specific range (camera shake allowance range TR in the state ST1) including the first position out of the specific range, moves the specific image to a region (region R in the state ST6) corresponding to the irradiation position (irradiation position P in the state ST5) moved out of the specific range in the image, and in a case where the irradiation position detected by the ray position detection portion moves within the specific range, continues superimposition of the specific image on the first region.

According to the projection control device of (1), a target location in the image projected on the projection surface can be clearly pointed out by the specific image by suppressing movement of the specific image caused by vibrations of a hand of a user pointing out a position using a ray. Thus, visibility of a projection image is improved.

(2) The projection control device according to (1), in which the specific image is superimposed on the image in a state of covering the first position, and the specific range is a range (camera shake allowance range TR in the state ST1) overlapping with the specific image in the image.

According to the projection control device of (2), display of the specific image continues in a stationary state as long as the irradiation position of the ray does not move out of the specific image. Thus, the target position intended by the user is easily pointed out by the specific image.

(3) The projection control device according to (1), further comprising a range control portion (range control portion 120C) that controls the specific range.

According to the projection control device of (3), by changing, depending on a magnitude or the like of vibrations of the hand of the user, a movement range of a position of the ray that is a determination reference as to whether or not to move the specific image, movement of the specific image caused by vibrations of the hand of the user can be more effectively suppressed.

(4) A projection control device (control portion 120) that controls a projection portion (projection portion 110) which projects an image (image G) to a projection surface (projection surface 401), the projection control device comprising a ray position detection portion (ray position detection portion 120A) that detects an irradiation position (irradiation position P) of a ray (ray LB) irradiated on the projection surface, and a specific image superimposition control portion (specific image superimposition control portion 120B) that superimposes a specific image (point-out icon image TG) on a region (region R) corresponding to the irradiation position in the image, in which in a state (state ST1) where the specific image is superimposed on a first region (region R in the state ST1) corresponding to a first position (irradiation position P in the state ST1) detected by the ray position detection portion in the image, the specific image superimposition control portion, in a case where a movement state where the irradiation position detected by the ray position detection portion moves in one direction continues a number of times greater than or equal to a first threshold value (state ST9), moves the specific image to a region corresponding to the last detected irradiation position (irradiation position P in the state ST10) in the image, and in a case other than a case where the movement state continues a number of times greater than or equal to the first threshold value, continues superimposition of the specific image on the first region.

According to the projection control device of (4), by moving the specific image only in a case where the movement state where the position of the ray moves in one direction continues a number of times greater than or equal to the first threshold value, slight movement of the specific image caused by vibrations of the hand of the user can be suppressed. Thus, the visibility of the projection image is further improved.

(5) The projection control device according to any one of (1) to (4), in which the ray position detection portion detects a pattern corresponding to the ray from a captured image of the projection surface output from an imaging apparatus to detect a position of the pattern as the irradiation position of the ray.

(6) The projection control device according to any one of (1) to (5), further comprising an image processing portion (image processing portion 120D) that performs correction processing for making a part corresponding to the irradiation position in the image not stand out on the image in a case where a state where a change amount of the irradiation position detected by the ray position detection portion is less than or equal to a second threshold value continues.

According to the projection control device of (6), in a case where the ray does not or almost not move, the part can be made not stand out by determining that the part is a marking or the like. Thus, the visibility of the projection image is further improved.

(7) The projection control device according to any one of (1) to (6), in which the specific image is superimposed on the image in a state of covering the first position, and the specific image superimposition control portion controls a color of the specific image to a first color that is the same as a color of the ray.

According to the projection control device of (7), by causing the color of the specific image and the color of the ray to be the same color, the specific image can be displayed without making an observer aware of the position of the ray.

(8) The projection control device according to (7), in which the ray position detection portion detects a pattern corresponding to the ray from a captured image of the projection surface output from an imaging apparatus (imaging apparatus 300) to detect a position of the pattern as the irradiation position of the ray, the specific image superimposition control portion performs processing of controlling the color of the specific image to the first color and processing of controlling the color of the specific image to a second color different from the first color in a switching manner, and the ray position detection portion detects the pattern from the captured image obtained by imaging the projection surface by the imaging apparatus in a state where the color of the specific image is controlled to the second color.

According to the projection control device of (8), by switching the color of the specific image between the first color that is the original color and the second color different from the first color, and detecting the pattern corresponding to the ray from the captured image of the projection surface in a case where the color of the specific image is the second color, the irradiation position of the ray can be accurately detected even in a case where the color of the specific image and the color of the ray are the same color.

(9) The projection control device according to (7), in which the ray position detection portion detects a pattern corresponding to the ray from a captured image of the projection surface output from an imaging apparatus (imaging apparatus 300) to detect a position of the pattern as the irradiation position of the ray, the projection control device further comprises a projection state control portion (projection state control portion 120E) that performs a control for switching between a projection state where the image is projected from the projection portion, and a non-projection state where the image is not projected from the projection portion, and the ray position detection portion detects the pattern from the captured image obtained by imaging the projection surface by the imaging apparatus in a state where the control is performed to the non-projection state.

According to the projection control device of (9), by switching between the projection state where the image is projected from the projection portion, and the non-projection state where the image is not projected, and detecting the pattern corresponding to the ray from the captured image of the projection surface in the non-projection state, the irradiation position of the ray can be accurately detected.

(10) A projection apparatus comprising the projection control device according to any one of (1) to (9), and the projection portion.

According to the projection control device of (10), a point-out target location in the image projected on the projection surface can be clearly pointed out by the specific image by suppressing movement of the specific image caused by vibrations of the hand of the user pointing out the position using the ray. Thus, the visibility of the projection image is improved.

(11) A projection control method of controlling a projection portion that projects an image to a projection surface, the projection control method comprising a ray position detection step of detecting an irradiation position of a ray irradiated on the projection surface, and a specific image superimposition control step of superimposing a specific image on a region corresponding to the irradiation position in the image, in which in the specific image superimposition control step, in a state where the specific image is superimposed on a first region corresponding to a first position detected in the ray position detection step in the image, in a case where the irradiation position detected in the ray position detection step moves from a specific range including the first position out of the specific range, the specific image is moved to a region corresponding to the irradiation position moved out of the specific range in the image, and in a case where the irradiation position detected in the ray position detection step moves within the specific range, superimposition of the specific image on the first region continues.

(12) The projection control method according to (11), in which the specific image is superimposed on the image in a state of covering the first position, and the specific range is a range overlapping with the specific image in the image.

(13) The projection control method according to (11), further comprising a range control step of controlling the specific range.

(14) A projection control method of controlling a projection portion that projects an image to a projection surface, the projection control method comprising a ray position detection step of detecting an irradiation position of a ray irradiated on the projection surface, and a specific image superimposition control step of superimposing a specific image on a region corresponding to the irradiation position in the image, in which in the specific image superimposition control step, in a state where the specific image is superimposed on a first region corresponding to a first position detected in the ray position detection step in the image, in a case where a movement state where the irradiation position detected in the ray position detection step moves in one direction continues a number of times greater than or equal to a first threshold value, the specific image is moved to a region corresponding to the last detected irradiation position in the image, and in a case other than a case where the movement state continues a number of times greater than or equal to the first threshold value, superimposition of the specific image on the first region continues.

(15) The projection control method according to any one of (11) to (14), in which in the ray position detection step, a pattern corresponding to the ray is detected from a captured image of the projection surface output from an imaging apparatus to detect a position of the pattern as the irradiation position of the ray.

(16) The projection control method according to any one of (11) to (15), further comprising an image processing step of performing correction processing for making a part corresponding to the irradiation position in the image not stand out on the image in a case where a state where a change amount of the irradiation position detected in the ray position detection step is less than or equal to a second threshold value continues.

(17) The projection control method according to any one of (11) to (16), in which the specific image is superimposed on the image in a state of covering the first position, and in the specific image superimposition control step, a color of the specific image is controlled to a first color that is the same as a color of the ray.

(18) The projection control method according to (17), in which in the ray position detection step, a pattern corresponding to the ray is detected from a captured image of the projection surface output from an imaging apparatus to detect a position of the pattern as the irradiation position of the ray, in the specific image superimposition control step, processing of controlling the color of the specific image to the first color and processing of controlling the color of the specific image to a second color different from the first color are performed in a switching manner, and in the ray position detection step, the pattern is detected from the captured image obtained by imaging the projection surface by the imaging apparatus in a state where the color of the specific image is controlled to the second color.

(19) The projection control method according to (17), in which in the ray position detection step, a pattern corresponding to the ray is detected from a captured image of the projection surface output from an imaging apparatus to detect a position of the pattern as the irradiation position of the ray, the projection control method further comprises a projection state control step of performing a control for switching between a projection state where the image is projected from the projection portion, and a non-projection state where the image is not projected from the projection portion, and in the ray position detection step, the pattern is detected from the captured image obtained by imaging the projection surface by the imaging apparatus in a state where the control is performed to the non-projection state.

(20) A projection control program causing a computer to execute a projection control method, the projection control method being a projection control method of controlling a projection portion that projects an image to a projection surface, and comprising a ray position detection step of detecting an irradiation position of a ray irradiated on the projection surface, and a specific image superimposition control step of superimposing a specific image on a region corresponding to the irradiation position in the image, in which in the specific image superimposition control step, in a state where the specific image is superimposed on a first region corresponding to a first position detected in the ray position detection step in the image, in a case where the irradiation position detected in the ray position detection step moves from a specific range including the first position out of the specific range, the specific image is moved to a region corresponding to the irradiation position moved out of the specific range in the image, and in a case where the irradiation position detected in the ray position detection step moves within the specific range, superimposition of the specific image on the first region continues.

(21) A projection control program causing a computer to execute a projection control method, the projection control method being a projection control method of controlling a projection portion that projects an image to a projection surface, and comprising a ray position detection step of detecting an irradiation position of a ray irradiated on the projection surface, and a specific image superimposition control step of superimposing a specific image on a region corresponding to the irradiation position in the image, in which in the specific image superimposition control step, in a state where the specific image is superimposed on a first region corresponding to a first position detected in the ray position detection step in the image, in a case where a movement state where the irradiation position detected in the ray position detection step moves in one direction continues a number of times greater than or equal to a first threshold value, the specific image is moved to a region corresponding to the last detected irradiation position in the image, and in a case other than a case where the movement state continues a number of times greater than or equal to the first threshold value, superimposition of the specific image on the first region continues.

While various embodiments are described above with reference to the drawings, the present invention is not limited to such examples. It is apparent that those skilled in the art may perceive various modification examples or correction examples within a scope disclosed in the claims, and those examples are also understood as falling in a technical scope of the present invention. In addition, any combination of various constituents in the embodiment may be used without departing from a gist of the invention.

The present application is based on Japanese Patent Application (JP2019-057126) filed on Mar. 25, 2019, the content of which is incorporated in the present application by reference.

EXPLANATION OF REFERENCES

1: image projection system
100: projection apparatus
200: laser pointer
LB: ray
P: irradiation position
300: imaging apparatus
400: screen
401: projection surface
G: image
110: projection portion
111: display portion
112: light source unit
112a: light source
112b: color wheel
112c: illumination optical system
113: light modulation element
114: projection optical system
120: control portion
120A: ray position detection portion
120B: specific image superimposition control portion
120C: range control portion
120D: image processing portion
120E: projection state control portion
R: region
TG: point-out icon image
TR: camera shake allowance range
A1, A2, A3, A4, A5: vector

What is claimed is:

1. A projection control device that controls a projection portion which projects an image to a projection surface, the projection control device comprising:
a ray position detection portion that detects an irradiation position of a ray irradiated on the projection surface; and
a specific image superimposition control portion that superimposes a specific image on a region corresponding to the irradiation position in the image,
wherein in a state where the specific image is superimposed on a first region corresponding to a first position detected by the ray position detection portion in the image in a state of covering the first position, the specific image superimposition control portion, in a case where the irradiation position detected by the ray position detection portion moves from a specific range overlapping with the specific image in the image to an outside of the specific range, moves the specific image to a region corresponding to the irradiation position that has moved to the outside of the specific range in the image, and in a case where the irradiation position detected by the ray position detection portion moves within the specific range, continues superimposition of the specific image on the first region.

2. The projection control device according to claim 1, further comprising
a range control portion that controls the specific range.

3. A projection control device that controls a projection portion which projects an image to a projection surface, the projection control device comprising:
a ray position detection portion that detects an irradiation position of a ray irradiated on the projection surface; and
a specific image superimposition control portion that superimposes a specific image on a region corresponding to the irradiation position in the image,
wherein in a state where the specific image is superimposed on a first region corresponding to a first position detected by the ray position detection portion in the image, the specific image superimposition control portion, in a case where a movement state where the irradiation position detected by the ray position detection portion moves in one direction continues a number of times greater than or equal to a first threshold value, moves the specific image to a region corresponding to a last detected irradiation position in the image, and in a case other than the case where the movement state continues the number of times greater than or equal to the first threshold value, continues superimposition of the specific image on the first region.

4. The projection control device according to claim 1, wherein the ray position detection portion detects a pattern corresponding to the ray from a captured image of the projection surface output from an imaging apparatus to detect a position of the pattern as the irradiation position of the ray.

5. The projection control device according to claim 1, further comprising
an image processing portion that performs correction processing for making a part corresponding to the irradiation position in the image not stand out on the image in a case where a state where a change amount of the irradiation position detected by the ray position detection portion is less than or equal to a second threshold value continues.

6. The projection control device according to claim 1, wherein the specific image is superimposed on the image in a state of covering the first position, and
the specific image superimposition control portion controls a color of the specific image to a first color that is same as a color of the ray.

7. A projection control device that controls a projection portion which projects an image to a projection surface, the projection control device comprising:
a ray position detection portion that detects an irradiation position of a ray irradiated on the projection surface; and
a specific image superimposition control portion that superimposes a specific image on a region corresponding to the irradiation position in the image and that controls a color of the specific image to a first color that is same as a color of the ray,
wherein in a state where the specific image is superimposed on a first region corresponding to a first position detected by the ray position detection portion in the image in a state of covering the first position, the specific image superimposition control portion, in a case where the irradiation position detected by the ray position detection portion moves from a specific range including the first position to an outside of the specific range, moves the specific image to a region corresponding to the irradiation position that has moved to the outside of the specific range in the image, and in a case where the irradiation position detected by the ray position detection portion moves within the specific range, continues superimposition of the specific image on the first region,
the ray position detection portion detects a pattern corresponding to the ray from a captured image of the projection surface output from an imaging apparatus to detect a position of the pattern as the irradiation position of the ray,
the specific image superimposition control portion performs processing of controlling the color of the specific image to the first color and processing of controlling the color of the specific image to a second color different from the first color in a switching manner, and
the ray position detection portion detects the pattern from the captured image obtained by imaging the projection surface by the imaging apparatus in a state where the color of the specific image is controlled to the second color.

8. A projection control device that controls a projection portion which projects an image to a projection surface, the projection control device comprising:
a ray position detection portion that detects an irradiation position of a ray irradiated on the projection surface; and
a specific image superimposition control portion that superimposes a specific image on a region corresponding to the irradiation position in the image and that controls a color of the specific image to a first color that is same as a color of the ray,
wherein in a state where the specific image is superimposed on a first region corresponding to a first position detected by the ray position detection portion in the image in a state of covering the first position, the specific image superimposition control portion, in a case where the irradiation position detected by the ray position detection portion moves from a specific range including the first position to an outside of the specific range, moves the specific image to a region corresponding to the irradiation position that has moved to the outside of the specific range in the image, and in a case where the irradiation position detected by the ray position detection portion moves within the specific range, continues superimposition of the specific image on the first region,
wherein the ray position detection portion detects a pattern corresponding to the ray from a captured image of the projection surface output from an imaging apparatus to detect a position of the pattern as the irradiation position of the ray,
the projection control device further comprises a projection state control portion that performs a control for switching between a projection state where the image is projected from the projection portion, and a non-projection state where the image is not projected from the projection portion, and
the ray position detection portion detects the pattern from the captured image obtained by imaging the projection surface by the imaging apparatus in a state where the control is performed to the non-projection state.

9. A projection apparatus comprising:
the projection control device according to claim 1; and
the projection portion.

10. A projection control method of controlling a projection portion that projects an image to a projection surface, the projection control method comprising:
a ray position detection step of detecting an irradiation position of a ray irradiated on the projection surface; and
a specific image superimposition control step of superimposing a specific image on a region corresponding to the irradiation position in the image,
wherein in the specific image superimposition control step, in a state where the specific image is superimposed on a first region corresponding to a first position detected in the ray position detection step in the image in a state of covering the first position, in a case where the irradiation position detected in the ray position detection step moves from a specific range overlapping with the specific image in the image to an outside of the specific range, the specific image is moved to a region corresponding to the irradiation position that has moved to the outside of the specific range in the image, and in a case where the irradiation position detected in the ray position detection step moves within the specific range, superimposition of the specific image on the first region continues.

11. The projection control method according to claim 10, further comprising:
a range control step of controlling the specific range.

12. A projection control method of controlling a projection portion that projects an image to a projection surface, the projection control method comprising:
a ray position detection step of detecting an irradiation position of a ray irradiated on the projection surface; and
a specific image superimposition control step of superimposing a specific image on a region corresponding to the irradiation position in the image,
wherein in the specific image superimposition control step, in a state where the specific image is superimposed on a first region corresponding to a first position detected in the ray position detection step in the image, in a case where a movement state where the irradiation position detected in the ray position detection step moves in one direction continues a number of times greater than or equal to a first threshold value, the specific image is moved to a region corresponding to a last detected irradiation position in the image, and in a case other than the case where the movement state continues the number of times greater than or equal to the first threshold value, superimposition of the specific image on the first region continues.

13. The projection control method according to claim 10, wherein in the ray position detection step, a pattern corresponding to the ray is detected from a captured image of the projection surface output from an imaging apparatus to detect a position of the pattern as the irradiation position of the ray.

14. The projection control method according to claim 10, further comprising:
an image processing step of performing correction processing for making a part corresponding to the irradiation position in the image not stand out on the image in a case where a state where a change amount of the irradiation position detected in the ray position detection step is less than or equal to a second threshold value continues.

15. The projection control method according to claim 10, wherein the specific image is superimposed on the image in a state of covering the first position, and
in the specific image superimposition control step, a color of the specific image is controlled to a first color that is the same as a color of the ray.

16. A projection control method of controlling a projection portion that projects an image to a projection surface, the projection control method comprising:
a ray position detection step of detecting an irradiation position of a ray irradiated on the projection surface; and
a specific image superimposition control step of superimposing a specific image on a region corresponding to the irradiation position in the image and controlling a color of the specific image to a first color that is the same as a color of the ray,
wherein in the specific image superimposition control step, in a state where the specific image is superimposed on a first region corresponding to a first position detected in the ray position detection step in the image in a state of covering the first position, in a case where the irradiation position detected in the ray position detection step moves from a specific range including the first position to an outside of the specific range, the specific image is moved to a region corresponding to the irradiation position that has moved to the outside of the specific range in the image, and in a case where the irradiation position detected in the ray position detection step moves within the specific range, superimposition of the specific image on the first region continues,
in the ray position detection step, a pattern corresponding to the ray is detected from a captured image of the projection surface output from an imaging apparatus to detect a position of the pattern as the irradiation position of the ray,
in the specific image superimposition control step, processing of controlling the color of the specific image to the first color and processing of controlling the color of the specific image to a second color different from the first color are performed in a switching manner, and
in the ray position detection step, the pattern is detected from the captured image obtained by imaging the projection surface by the imaging apparatus in a state where the color of the specific image is controlled to the second color.

17. A projection control method of controlling a projection portion that projects an image to a projection surface, the projection control method comprising:
a ray position detection step of detecting an irradiation position of a ray irradiated on the projection surface; and
a specific image superimposition control step of superimposing a specific image on a region corresponding to the irradiation position in the image and controlling a color of the specific image to a first color that is the same as a color of the ray,
wherein in the specific image superimposition control step, in a state where the specific image is superimposed on a first region corresponding to a first position detected in the ray position detection step in the image in a state of covering the first position, in a case where the irradiation position detected in the ray position detection step moves from a specific range including the first position to an outside of the specific range, the specific image is moved to a region corresponding to the irradiation position that has moved to the outside of the specific range in the image, and in a case where the irradiation position detected in the ray position detection step moves within the specific range, superimposition of the specific image on the first region continues,
in the ray position detection step, a pattern corresponding to the ray is detected from a captured image of the projection surface output from an imaging apparatus to detect a position of the pattern as the irradiation position of the ray,
the projection control method further comprises a projection state control step of performing a control for switching between a projection state where the image is projected from the projection portion, and a non-projection state where the image is not projected from the projection portion, and
in the ray position detection step, the pattern is detected from the captured image obtained by imaging the projection surface by the imaging apparatus in a state where the control is performed to the non-projection state.

18. A non-transitory computer readable medium storing a projection control program causing a computer to execute a projection control method of controlling a projection portion that projects an image to a projection surface, the projection control method comprising:
- a ray position detection step of detecting an irradiation position of a ray irradiated on the projection surface; and
- a specific image superimposition control step of superimposing a specific image on a region corresponding to the irradiation position in the image,
- wherein in the specific image superimposition control step, in a state where the specific image is superimposed on a first region corresponding to a first position detected in the ray position detection step in the image in a state of covering the first position, in a case where the irradiation position detected in the ray position detection step moves from a specific range overlapping with the specific image in the image to an outside of the specific range, the specific image is moved to a region corresponding to the irradiation position that has moved to the outside of the specific range in the image, and in a case where the irradiation position detected in the ray position detection step moves within the specific range, superimposition of the specific image on the first region continues.

19. A non-transitory computer readable medium storing a projection control program causing a computer to execute a projection control method of controlling a projection portion that projects an image to a projection surface, and comprising:
- a ray position detection step of detecting an irradiation position of a ray irradiated on the projection surface; and
- a specific image superimposition control step of superimposing a specific image on a region corresponding to the irradiation position in the image,
- wherein in the specific image superimposition control step, in a state where the specific image is superimposed on a first region corresponding to a first position detected in the ray position detection step in the image, in a case where a movement state where the irradiation position detected in the ray position detection step moves in one direction greater than or equal to a first threshold value continues a number of times greater than or equal to a second threshold value, the specific image is moved to a region corresponding to a last detected irradiation position in the image, and in a case other than the case where the movement state continues the number of times greater than or equal to the second threshold value, superimposition of the specific image on the first region continues.

* * * * *